United States Patent [19]
Loris et al.

[11] Patent Number: 4,876,731
[45] Date of Patent: Oct. 24, 1989

[54] NEURAL NETWORK MODEL IN PATTERN RECOGNITION USING PROBABILISTIC CONTEXTUAL INFORMATION

[75] Inventors: Keith Loris, Brooklyn; James Euchner, Bedford, both of N.Y.

[73] Assignee: Nynex Corporation, New York, N.Y.

[21] Appl. No.: 158,215

[22] Filed: Feb. 19, 1988

[51] Int. Cl.$^4$ .............................................. G06K 9/62
[52] U.S. Cl. ........................................ 382/40; 382/7; 382/15; 382/36
[58] Field of Search ................... 382/40, 36, 15, 7, 14, 382/11

[56] References Cited

U.S. PATENT DOCUMENTS

| | | | |
|---|---|---|---|
| 3,440,617 | 4/1969 | Lesti | 340/172.5 |
| 3,601,811 | 8/1971 | Yoshino | 340/172.5 |
| 3,638,196 | 1/1972 | Nishiyama et al. | 340/172.5 |
| 3,810,162 | 5/1974 | Ewing, Jr. et al. | 340/172.5 |
| 4,081,791 | 3/1978 | Pollard et al. | 340/146.34 |
| 4,385,285 | 5/1983 | Horst et al. | 382/3 |
| 4,479,241 | 10/1984 | Buckley | 382/15 |
| 4,599,692 | 7/1986 | Tan et al. | 364/513 |
| 4,741,045 | 4/1988 | Denning | 382/9 |
| 4,754,489 | 6/1988 | Bokser | 382/40 |

OTHER PUBLICATIONS

Biological Cybernetics 55, 5-15 (1986) "A Neural Network Model for Selective Attention in Visual Pattern Recognition",Kunihiko Fukushima.
"Computing with Neural Networks"-June Kinoshita and Nicholas G. Palevsky, High Technology, May 1987, pp. 24-31.
"Blackboard System: The Blackboard Model of Problem Solving and Evolution of Blackboard Architectures", H. Penny Nii, The AI Magazine, Summer 1988, pp. 38-53.
"Blackboard Systems: Blackboard Application Systems, Blackboard Systems from a Knowledge Engineering Perspective", H. Penny Nii, The AI Magazine, Aug. 1988, pp. 82-106.

Primary Examiner—David K. Moore
Assistant Examiner—Yon Jung
Attorney, Agent, or Firm—Douglas J. Kirk; John J. Torrente

[57] ABSTRACT

A pattern recognition system for recognizing an unknown pattern comprised of symbols which are part of a pattern system which is devoid of inherent context such as numbers. Artificial contextual information based on other than symbol features and the pattern system and in the form of probability weighted expected interpretations are stored and used in the processing phase of recognition. In the system disclosed, the system comprises a neural network whose forward and feedback paths are controlled by the output cells of the network based, in part, on the contextual information.

32 Claims, 1 Drawing Sheet

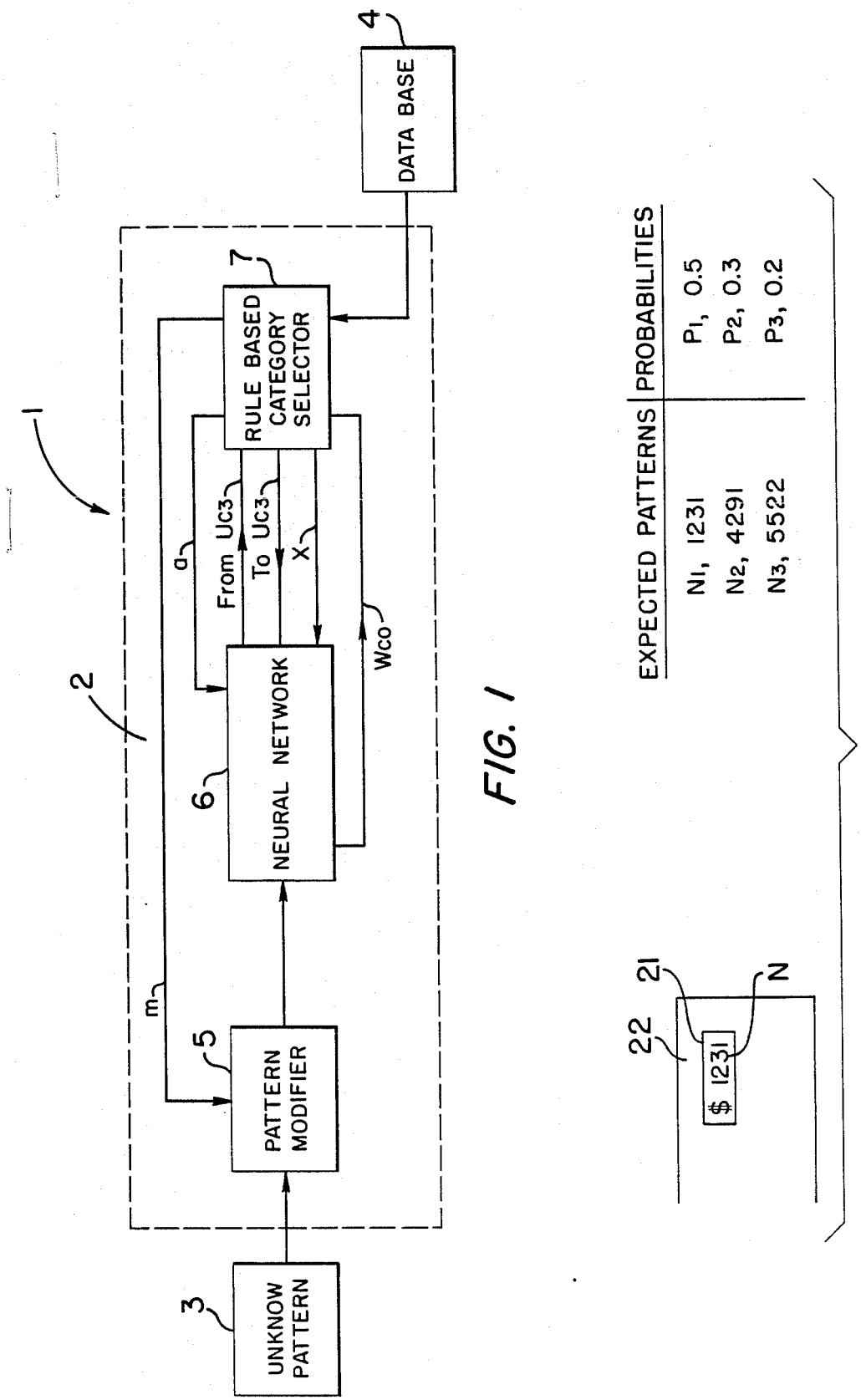

NEURAL NETWORK MODEL IN PATTERN RECOGNITION USING PROBABILISTIC CONTEXTUAL INFORMATION

BACKGROUND OF THE INVENTION

This invention relates to pattern recognition systems and, in particular, to pattern recognition systems which employ context and expected values in the recognition process.

In a variety of pattern recognition systems in use today, the inherent or natural context of the patterns being recognized is used to aid the recognition system in making its recognition decision. Patterns are said to have inherent context if there are natural rules or criteria governing the patterns and the interrelationships between patterns or groups of patterns. A particular example of patterns having such inherent context are words and groups of words as in a sentence. In word recognition systems, the semantic and syntactic rules of usage of the language provide inherent context for helping to recognize the individual letters, words and groups of words. In robotic object recognition systems, the natural order of the world provides inherent context. For example, the laws of physics and knowledge about the type of scene (e.g., urban, battlefield, factory, etc.) assist in the recognition of objects and groups of objects. In both cases, the higher-level inherent or natural contextual information can fill in the missing lower level pieces.

While the inherent context of certain patterns has thus proved helpful in recognizing these patterns, there are many types of patterns which do not have any inherent context. For these patterns there has been no use of context in the recognition process. As a result, recognizing these patterns is more difficult and time consuming than would otherwise be the case if context were used.

Digits, alphanumerics or numbers, are types of patterns without natural or inherent context. Thus, in attempting to recognize alphanumerics there is no higher level meaning or set of rules governing the relationship of the individual numbers or sets of numbers which would be useful in the recognition process. Recognition therefore, is more difficult than would otherwise be the case if inherent context were present.

Systems are available, however, for number and other symbol recognition. A particularly advantageous system is the one disclosed in an Article entitled "A Neural Network Model for Selective Attention in Visual Pattern Recognition," written by Kunihiko Fukushima and published in *Biological Cybernetics*, 55, 5-15 (1986). This article in its entirety is incorporated herein by reference.

As illustrated in FIG. 1 of the Fukushima article, the pattern recognition system of Fukushima is a so-called "hierarchical neural network" having both forward ("afferent") and feedback ("efferent") connections between and within the stages ($U_0$, $U_1$, $U_2$, $U_3$) of multiple layers of the neural cells (e.g., in the forward path, the cell $U_{c0}$ of the stage $U_0$ and, in the feedback path, the cell $W_{c0}$ in the first stage $U_0$ and the cell $W_{c3}$ in the last stage $U_3$) of the network. These connections are weighted or adjusted by the network during a learning period of the system so that symbols having different essential features result in a maximum output at different output cells (i.e., so called "gnostic cells" $U_{c3}$) in the highest level or output stage $U_3$ of the network. Each symbol is, therefore, categorized by the system according to its essential features. After learning, each gnostic cell of the network is, in turn, associated by the user with some specific category name which is a known common identifier of the symbols whose essential features have been associated with the cell during learning. Thus, for example, where numbers are being recognized, the category names would be the known numbers 0–9 indicative of symbols having the essential features of these known numbers.

The Fukushima network thus learns to categorize presented symbols, i.e., to develop a correspondence between individual symbols and associated output cells. Accordingly, when an unknown pattern (which consists of a sequence of one or more symbols) is presented to the network during its recognition period, the pattern causes the network to develop a sequence of steady states in each of which there is a maximum output at one of the output cells. In each case an unknown symbol is therefore recognized by the network as having the essential symbol features corresponding to this output cell and, therefore, is identifiable by its category name.

During recognition by the Fukushima network, i.e., from presenting a pattern to final steady state (i.e., steady state for the last unrecognized symbol of the pattern), whichever output cell has a maximum output at any given time controls the efferent paths of the network. This is accomplished by use of a maximum detector which compares outputs of the gnostic cells o detect the maximum output. The efferent paths are then controlled by the detector signals via coupling these signals over the signal path X so as to facilitate cells of the network associated with the essential symbol features of the maximum output cell and to inhibit cells of the network which are not associated with these symbol features. The attention of the network thus becomes directed to particular symbol features and this facilitating and inhibiting effect continues until the network is driven to steady state and reaches its decision. During this processing phase, the symbol features upon which attention is focused thus become an integral part of the iterative recognition process.

While not present in the Fukushima system, there are other types of systems which upon completion of the processing phase enter a post-processing phase. In this phase the decision reached by the recognition system is either accepted or rejected in dependence upon comparison of the recognized pattern with an expected pattern. One system of this type has been proposed for reading the digits corresponding to the dollar amounts written on bank checks received in payment of bills. In this system, the previously recognized value is compared with a billed amount.

While the recognition systems of the prior art and, in particular, the Fukushima system, are useable pattern recognition systems, there still is a need for a pattern recognition system which can more quickly and reliably recognize patterns, especially multiple symbol patterns and severely deformed patterns.

It is, therefore, a primary object of the present invention to provide such a pattern recognition system.

It is a further object of the present invention to provide such a pattern recognition system utilizing derived contextual information for the patterns to be recognized.

It is yet a further object of the present invention to provide such a pattern recognition system utilizing expected interpretations of the patterns to be recognized and associated probabilities.

It is still a further object of the present invention to provide such a pattern recognition system for recognizing any symbol and, in particular, typed or hand written numbers.

It is also an object of the present invention to provide such a pattern recognition system for recognizing numbers on checks used in payment of bills.

SUMMARY OF THE INVENTION

In accordance with the principles of the present invention, the above and other objectives are realized in a pattern recognition system wherein probability weighted expected interpretations of an unknown pattern are utilized as a form of artificial or derived context (as opposed to inherent or natural context) in the processing (as opposed to post-processing) phase of system operation. By using these weighted expected interpretations during processing (i.e., integrally to the recognition task), the system is more able to readily, reliably and quickly recognize unknown patterns.

In the form of the invention to be disclosed hereinafter, the recognition system is a modified type of the basic system disclosed in the Fukushima article. In particular, the Fukushima system is modified so that instead of controlling the efferent paths during the processing phase based upon the output cell with maximum output, control is effected based upon the gnostic cell outputs as well as the probability weighted expected interpretations. This information is processed in a ruled based category selector utilizing certainty factors to select a gnostic cell (i.e., to control the efferent or feedback paths).

In a further aspect of the present invention, where the pattern comprises a sequence of symbols and the probability weighted expected interpretations relate to the pattern, the category selector is also utilized to update the certainty factors associated with the probability weightings of the expected interpretations as symbols of the sequence are recognized. These updated values are then used by the selector in determining the output cell to be used for feedback control.

In yet a further aspect of the present invention, once a particular symbol in a pattern is recognized, the category selector addresses an input pattern modifier which acts to delete the recognized symbol from the input making it easier to recognize the remaining symbols. Also, means is provided for automatically shifting the attention of the system from an already recognized symbol in a pattern so that the system moves on to recognize the remaining symbols.

BRIEF DESCRIPTION OF THE DRAWING

The above and other features and aspects of the present invention will become more apparent upon reading the following detailed description in conjunction with the accompanying drawings, in which:

FIG. 1 shows a recognition system in accordance with the principles of the present invention; and FIG. 2 illustrates a number pattern and a corresponding set of probability weighted expected interpretations for this pattern.

DETAILED DESCRIPTION

In FIG. 1, a recognition system 1 in accordance with the principles of the present invention is shown. The recognition system 1 comprises a recognizer 2 to which is fed via, for example, a pixel matrix, an unknown pattern 3 and to which is also fed contextual information from an external data base 4. The recognizer 2 comprises, a pattern modifier 5 whose output feeds a neural network 6 which communicates with a category selector 7. As shown, the selector 7 is in the form of a rule based category selector.

In the present illustrative case, each pattern to be recognized is a sequence N of individual handwritten or printed numbers (see FIG. 2) which might appear in the courtesy amount region 21 of a check 22 used in payment of a bill such as, for example, a telephone bill. As illustrated, the data base 4 stores three expected interpretations (i.e., likely values) $N_1$, $N_2$, $N_3$ of the presented pattern (see, FIG. 2), one for each number sequence corresponding to a current bill amount, a prior bill amount and the sum of these two bill amounts, with corresponding weightings or probabilities $P_1$, $P_2$, $P_3$. These probabilities may be derived from statistics maintained by the billing party with respect to checks received in payment of current bills and along with the expected interpretations serve as a form of artificial or derived contextual information for the unknown pattern. As above-indicated, it is this derived contextual information which is integrally used during the processing phase of the recognizer 2 to achieve recognition.

As depicted in FIG. 1, the neural network 6 is assumed to be in FIG. 1 of the Fukushima article. The parameters $U_{c3}$, $W_{c3}$, $W_{c0}$ and X thus correspond to those parameters as described above. More particularly, the network 6 is assumed to include the components of the Fukushima type, absent the maximum detector which is used to control the efferent paths of the network during the processing phase. As above-indicated, in the present invention, such control of the efferent paths is effected utilizing the rule-based category selector 7 based upon the rules and the probability weighted expected interpretations or values (derived contextual information) stored in external data base 4.

While an extensive explanation of the Fukushima type neural network has been is set forth above, a brief summary of the operation of the network will again be given to facilitate understanding of the network as modified in accordance with the present invention. More particularly, when an unknown pattern to be recognized (such as the number N of FIG. 2) is presented to the neural network, the attention of the network becomes initially directed to one of the symbols of the pattern. As a result, one of the output or gnostic cells $U_{c3}$ of the network takes on a maximum value. This amounts to a preliminary or partial recognition by the network that the symbol has the essential symbol features associated with the maximum cell and, hence, can be identified with its category name. It is partial recognition because it is made even if the recognition has a low confidence level, i.e., the maximum output value is a relatively low maximum.

The aforesaid maximum value is then detected by the maximum detector and the maximum detector, in turn, communicates this information to the efferent or feedback paths of the network, i.e., to the cells $W_{c3}$ in the feedback path of the last module $U_3$. The feedback paths respond to this excitation by facilitating the response of those cells in the afferent or forward path of the network which led to the preliminarily recognized symbol and inhibiting the response of other cells. This process iteratively continues as the network increases its confidence level (as evidenced by an increase in the maximum value) until the network reaches steady state. If the network is sufficiently confident at this time (i.e., if the maximum value exceeds a predetermined threshold value), the unknown symbol is recognized as the category name of the gnostic cell with maximum output.

Once this occurs, the network is interrupted and its attention then becomes focused on another of the unknown symbols of the unknown pattern. The above procedure repeats and this unknown symbol is recognized. The remaining unknown symbols are then also recognized in similar fashion.

While the neural network 6 of the present invention functions as just described, the determination of which of the gnostic cells of the network should control the feedback paths of the network during processing is now under the control of the rule based category selector 7. The rule based category selector 7 monitors the outputs of all the gnostic cells and receives contextual information from the data base 4. Based on the original probability weighted expected interpretations or values of the unknown pattern (the derived context) and on a set of rules of the selector which modify the certainty associated with each expected value as the outputs of the gnostic cells change and individual symbols are recognized, the rule-based category selector selects which gnostic cell should control the efferent or feedback paths at each stage of the processing phase and for each symbol in the pattern. As a result of this integral use of the additional probabilistic information (the derived context) by the selector in controlling the feedback paths, the neural network 6 will be more efficiently, more quickly and more certainly driven to steady state or convergence for each symbol being recognized. Operation of the network will thus be greatly improved. The network, moreover, will now also be able to recognize severely deformed and/or ambiguous symbols or sequences of symbols which it would not have otherwise been able to recognize.

In further accord with the invention, the category selector 7 is additionally adapted to store information concerning the particular symbols in an unknown pattern as these symbols become recognized. The selector 7, furthermore, is also able to determine and store the entire bit pattern of a recognized symbol (through receipt of the input $W_{c0}$), along with its average horizontal bit position.

The stored information on the recognized symbols is used by the selector 7 to update the certainties or probabilities of the expected values of the unknown pattern. Additionally, once a symbol in a pattern has been recognized, the stored bit pattern of the recognized symbol and the average horizontal bit position of the recognized symbol are used by the selector 7 to develop signal m for modifying the unknown input pattern. Selector 7 is also used to detect steady state and to develop signal a for automatically interrupting the network.

The signal m is first generated by the selector 7 and it instructs the pattern modifier 5 to delete from the unknown input, the symbol bits just recognized. The signal a, in turn, is then generated to interrupt the neural network 6 so that the network changes its attention from a just recognized symbol to another not yet recognized symbol in the sequence.

While the selector 7 is illustrated in the present embodiment as a rule based category selector, it can also be an other known type of selector having software adapted to function as above-described. Of course, the particular decision criteria or rules which the selector utilizes to process the gnostic cell outputs and the probability weighted expected values will depend upon each particular application, including the nature of the patterns being recognized. One type of rule-based selector which might be used is a selector based on an expert system shell using certainty factor calculus. A typical expert system shell utilizing one such certainty factor calculus is one manufactured by Teknowledge under the brand name "M.1.".

A rule based system used for the selector 7 might typically comprise three parts: an inference engine, a rule set (a collection of rules of the form "IF A and B and C then D") and a cache (or database of known facts, each of which is known with some certainty). The system would operate in the following way. Given an initial set of facts, associated certainties and a goal (e.g., "select a gnostic cell"), the inference engine searches the rule set for rules which will help it to achieve the goal by deriving a new fact from already known facts or from facts which can be derived from known facts and the rule set. If all the premises in a rule are known with some certainty, the rule is satisfied and its concluding clause asserted as a new fact. The certainty factors of the clauses of the rule are disjunctively and/or conjunctively combined using an established certainty factor calculus to obtain a combined certainty factor which is multiplied by the certainty factor associated with the rule itself to derive a certainty factor for the newly derived fact. If the same fact is asserted more than once, the certainties of the separate assertions are combined to reflect the corroborating information. Since the goal might be achieved in a variety of distinct ways by different combinations of rules and facts, the system selects the goal achieved with the highest overall certainty factor.

In the present application, the facts initially in the cache would be based upon the outputs of the gnostic cells and the expected interpretations of the patterns. The certainty factors, in turn, for the gnostic cells would depend on the relative magnitudes of the cell outputs and those for the expected patterns on the related probabilities.

While, as above-described, the rule set for a particular category selector 7 would depend upon each individual situation, an illustrative, simplified set of selection rules is given below. Also, application of these rules to selection of particular gnostic cells in recognizing the number N of FIG. 2 is likewise provided. In applying the rules the following govern.

(1) "X", "Y" and "C" are variables and the rules might be instantiated by several sets of facts in which the variables hold the proper relations to one another.

(2) Each premise has a certainty factor (CF) associated with it. This CF is given in the following way for various premises:

(a) The CF for the premise: "the gnostic cell for known symbol 'X' is on", is the normalized magnitude of the gnostic cell associated with that symbol.

(b) The CF for the premise: "'X' is a symbol in expected pattern 'Y'", is initially the probability of 'Y' as given in the external data base 4. This CF will be updated by other rules.

(c) The CF for a Boolean premise is 1 if the premise is true and 0 if the premise is false.

(d) The CF for any other premise is as determined by the rule set.

The CF's for each rule are assigned using the judgment and experience of the recognition system designer based upon the particular application.

The representative rule set (in English syntax) is as

Rule 1:
If:
    PREMISE 1: The gnostic cell for the known symbol "X" is on; and
    PREMISE 2: "X" is a symbol in the expected pattern "Y",
Then: Select the gnostic cell for symbol "X". [Certainty factor for rule is $R_1$].

Rule 2
If:
    PREMISE 1: One symbol of the pattern has been recognized; and
    PREMISE 2: the interpretation of that symbol is "X"; and
    PREMISE 3: "X" is a symbol in the pattern "Y"; and
    PREMISE 4: "X" is not a symbol in any other expected pattern,
Then: Increase the probability that the pattern is "Y"; and decrease the probability that the pattern is any other expected pattern. [Certainty factor of rule 2 is $R_2$]

Rule 3:
If:
    PREMISE 1: One symbol of the pattern has been recognized; and
    PREMISE 2: the recognized symbol appears in all expected patterns;
Then: Do not adjust the probabilities of any of the expected patterns. [Certainty factor of rule 3 is $R_3$].

Rule 4:
If:
    PREMISE 1: The second symbol of a pattern is being recognized; and
    PREMISE 2: the gnostic cell for pattern "X" is on; and
    PREMISE 3: "X" is a symbol in the expected pattern "Y"; and
    PREMISE 4: the symbol recognized so far is "C"; and
    PREMISE 5: "C" is a symbol in the expected pattern "Y"; and
    PREMISE 6: "C" and "X" appear in the sequence in the order that they do in the expected pattern (according to their average horizontal bits);
Then: select the gnostic cell for the symbol "X". [Certainty factor of rule 4 is $R_4$.]

Rule 5:
If:
    PREMISE 1: none of the rules are satisfied;
Then: select the gnostic cell with the largest magnitude. [Certainty factor of rule 5 is $R_5$.]

As above-indicated, certainty factors for the foregoing rule set are applied by first combining the certainty factors for the premises of a rule that fires and then combining the resultant with the certainty factor for the rule to obtain an overall certainty factor. This overall certainty factor may be altered using the certainty factor calculus by separate assertions of the same fact (corroborating information). When all applicable rules have fired, the overall certainty factors for the resultant derived goal facts (those derived facts which satisfy the goal of selecting a gnostic cell) are then compared and the goal fact with highest overall certainty is selected. This goal fact then governs selection of the gnostic cell of the neural network 6 which is to be used to control the feedback paths of the network.

As an example of how the rule set operates, it will be applied to identification of the number N of FIG. 2. For this example, it will be assumed that the certainty factor for Rule 4, $R_4$, is equal to 0.9, and the certainty factors for all the other rules are equal to 1.0.

When the number N is first presented to the neural network 6, let it be assumed that the gnostic cell with the category name "2" turns on with a normalized magnitude of 0.8. The category selector 7 then evaluates the rule set based on this output and the probabilities $P_1$, $P_2$, $P_3$ (0.5, 0.3, 0.2) of the expected interpretations or values $N_1$, $N_2$ and $N_3$ shown in FIG. 2. This evaluation will result in the Rule 1 being fired (all premises are satisfied) and the gnostic cell with the category name "2" being selected three times (once for each of the expected numbers $N_1$, $N_2$ and $N_3$) with respective individual certainty factors of 0.5, 0.3 and 0.2. These individual certainty factors are determined using the rule certainty factors, $CF_{RULE}$, and the premise certainty factors, $CF_{PREM}$, in accordance with the following equation.

$$CF_{INDIV} = CF_{RULE} \times \text{MIN} \{CF_{PREM}\} \quad (1)$$

(1) for rules with conjunctive premises. For rules with disjunctive premises, the rule is split into its equivalent rules with conjunctive premises.

If a fact is asserted once, the overall certainty factor $CF_{OVERALL}$ for that fact is $CF_{INDIV}$. If a fact is asserted more than once (as above), the corroborating information reinforces the conclusion. The first time the fact is asserted, $CF_{OVERALL}$ is set to $CF_{INDIV}$. If the same fact is asserted again based on independent information, the individual certainty factor for the second assertion $CF_{INDIV}$ is combined with $CF_{OVERALL}$ to derive a new $CF_{OVERALL}$ for the asserted fact:

$$CF_{OVERALL}(NEW) = CF_{OVERALL} + (1 - CF_{OVERALL}) \times CF_{INDIV} \quad (2)$$

Applying the above to the multiple selection of the category name "2" results in the overall certainties as follows:

$CF_{OVERALL} = 1.0 \, (0.5) = 0.5$     [first assertion]

$CF_{OVERALL} = 1.0 \, [0.5 + (1 - 0.5)(0.3)] = 0.65$     [second assertion]

$CF_{OVERALL} = 1.0 \, [0.65 + (1 - 0.65)(0.2)] = 0.72$     [third assertion]

If these are the only rules relating to the goal of selecting a gnostic cell that are satisfied, the gnostic cell and, therefore, symbol with the highest certainty factor (in this case "2" with certainty factor 0.72) will be selected. The category name or number "2" will thus control the feedback paths of the neural network.

Under this control when the neural network 6 reaches steady state, the number "2" will be recognized as being a symbol in the unknown N. At this time, Rule 2 will not be satisfied because the number "2" appears in all expected patterns $N_1$, $N_2$, $N_3$. As a result, the probabilities for the expected patterns will not be adjusted.

Now assume that after recognition of the number "2", erasure of the associated bit pattern by m and following the interruption of the neural network 6 by the signal a, the network redirects its attention to the number "9" causing the corresponding gnostic cell to turn on with normalized magnitude 0.7. Assuming further that the average horizontal bit position of the number "9" upon which the attention of the neural network module 6 is focused is such that the number "9" follows the number "2" already recognized, Rules 1 and 4 will be satisfied with a resultant overall certainty 0.49 calculated in accordance with the above.

Other rules (not indicated) may also fire and the gnostic cell for the goal fact asserted with maximum certainty factor will be selected. This will continue until the number N is recognized.

As can be appreciated, with recognition system 1 configured as above, the system exhibits marked advantages over the Fukushima network since additional information is brought to bear on the recognition task. Thus, the system has increased speed and accuracy in carrying out the recognition process, because of the use of the derived contextual information in the processing phase of the system operation. Also, the ability to recognize sequences of symbols or deformed patterns is enhanced.

It should be noted that the functions of the system 1 as illustrated in FIG. 1, can be carried out by a programmed computer or microprocessor. Furthermore, while the system has been illustrated in terms of recognizing patterns comprised of number symbols which correspond to check amounts with associated probabilities based on current and past bills, the system can be used to recognize patterns comprised of all types of symbols. Accordingly, as used herein, the term symbol is meant in its broadest sense and is intended to include any and all types of characters, numbers, drawings and indicia of any nature.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A system for recognizing an unknown pattern, said unknown pattern including one or more symbols which are part of a pattern system which is devoid of inherent context, comprising:

storing means for storing artificial contextual information associated with said unknown pattern and based upon other than information as to symbol features and the pattern system; and recognizer means responsive to said known pattern and to said artificial contextual information, said recognizer means having a processing phase wherein said recognizer means processes at least one symbol of said unknown pattern and outputs as a recognition decision that said one symbol is one of a plurality of category names and wherein in reaching said recognition decision during said processing phase utilizes said artificial contextual information.

2. A system in accordance with claim 1 wherein: said unknown pattern includes a plurality of symbols; and said recognizer means during said processing phase processes each of said symbols of said unknown pattern and outputs as a recognition decision for each of said symbols that the symbol is one of a plurality of category names and in reaching said recognition decision during said processing phase utilizes said derived contextual information.

3. A system in accordance with claim 2 wherein: said derived contextual information comprises expected interpretations of said unknown pattern and probability values associated with such expected interpretations.

4. A system in accordance with claim 3 wherein: said unknown pattern is a sequence of individual numbers.

5. A system in accordance with claim 4 wherein: said numbers correspond to the dollar amount of a check.

6. A system in accordance with claim 5 wherein: said check is utilized in payment of a bill.

7. A system in accordance with claim 6 wherein: one of said expected interpretations of said unknown pattern corresponds to the dollar amount of said bill.

8. A system in accordance with claim 7 wherein: others of said expected interpretations of said unknown pattern correspond to the dollar amount of a bill previous to said bill and the sum of the dollar amounts of said bill and previous bill.

9. A system in accordance with claim 8 wherein: said bills are telephone bills.

10. A system in accordance with claim 2 wherein: said recognizer means comprises: neural network means responsive to said unknown pattern for carrying out said processing phase; and selector means responsive to said derived contextual information for controlling said neural network.

11. A system in accordance with claim 10 wherein: said neural network means comprises: a plurality of stages of cells including an input stage for receiving said unknown pattern and an output stage having output cells each corresponding to a different one of said category names and to a different set of essential symbol features; an afferent path connecting said stages; and an efferent path connecting said stages for facilitating and inhibiting said afferent path; and said selector means is responsive to said output cells and based thereon and on said derived contextual information controls said efferent path.

12. A system in accordance with claim 11 wherein: said selector means selects one of said output cells to condition said efferent path so said efferent path facilitates transmission in said afferent path associated with the set of essential symbol features corresponding to said selected output cell.

13. A system in accordance with claim 12 wherein: said selector means comprises a rule based selector operating on the basis of certainty factor calculus.

14. A system in accordance with claim 10 wherein: said recognizer means comprises means for automatically changing the attention of said neural network when said recognizer means outputs a recognition decision with respect to a symbol in said pattern.

15. A system in accordance with claim 2 wherein;

said recognizer means comprises means for deleting from said unknown pattern the symbols of said unknown pattern for which said recognizer means has already made a recognition decision.

16. A system in accordance with claim 2 wherein:
said recognizer means includes means for adjusting said derived contextual information in dependence on said recognizer means reaching a recognition decision with respect to the individual symbols in said pattern.

17. A method of recognizing an unknown pattern, said unknown pattern including one or more symbols which are part of a pattern system which is devoid of inherent context, comprising:
storing artificial contextual information associated with said unknown pattern and based upon other than information as to symbol features and the pattern system; and
recognizing said unknown pattern by processing at least one symbol of said unknown pattern and outputting as a recognition decision that said one symbol is one of a plurality of category names utilizing said artificial contextual information.

18. A method in accordance with claim 17 wherein:
said unknown pattern includes a plurality of symbols;
and said recognizing includes processing each of said symbols of said unknown pattern and outputting a recognition decision for each of said symbols that the symbol is one of a plurality of category names utilizing said derived contextual information.

19. A method in accordance with claim 18 wherein:
said derived contextual information comprises expected interpretations of said unknown pattern and probability values associated with such expected interpretations.

20. A method in accordance with claim 19 wherein:
said unknown pattern is a sequence of individual numbers.

21. A method in accordance with claim 20 wherein:
said numbers correspond to the dollar amount of a check.

22. A method in accordance with claim 21 wherein:
said check is utilized in payment of a bill.

23. A method in accordance with claim 22 wherein:
one of said expected interpretations of said unknown pattern corresponds to the dollar amount of said bill.

24. A method in accordance with claim 23 wherein: others of said expected interpretations of said unknown pattern correspond to the dollar amount of a bill previous to said bill and the sum of the dollar amounts of said bill and previous bill.

25. A method in accordance with claim 24 wherein:
said bills are telephone bills.

26. A method in accordance with claim 18 wherein:
said processing step is carried out by neural network means responsive to said unknown pattern and by selector means responsive to said derived contextual information for controlling said neural network.

27. A method in accordance with claim 26 wherein:
said neural network means comprises: a plurality of stages of cells including an input stage for receiving said unknown pattern and an output stage having output cells each corresponding to a different one of said category names and to a different set of essential symbol features; an afferent path connecting said stages; and an efferent path connecting said stages for facilitating and inhibiting said afferent path; and
said selector means is responsive to said output cells and based thereon and on said derived contextual information and controls said efferent path.

28. A method in accordance with claim 27 wherein:
said selector means selects one of said output cells to condition said efferent path so said efferent path facilitates transmission in said afferent path associated with the set of essential symbol features corresponding to said selected output cell.

29. A method in accordance with claim 28 wherein:
said selector means comprises a rule based selector operating on the basis of certainty factor calculus.

30. A method in accordance with claim 26 wherein:
said recognizing comprises automatically changing the attention of said neural network when a recognition decision with respect to a symbol in said pattern is reached.

31. A method in accordance with claim 18 wherein:
said recognizing step includes deleting from said unknown pattern the symbols of said unknown pattern for which a recognition decision has already been reached.

32. A method in accordance with claim 18 wherein:
said recognizing step includes adjusting said derived contextual information in dependence on reaching a recognition decision with respect to the individual symbols in said pattern.

* * * * *

UNITED STATES PATENT AND TRADEMARK OFFICE
CERTIFICATE OF CORRECTION

PATENT NO. : 4,876,731
DATED : October 24, 1989
INVENTOR(S) : Keith Loris, et al.

It is certified that error appears in the above-identified patent and that said Letters Patent is hereby corrected as shown below:

```
Col. 2, line 29, change "o" to -- to --.
Col. 2, line 43, change "Fukishima" to -- Fukushima --.
Col. 4, line 28, after "be" insert -- of the Fukushima
    type discussed at length above and shown --.
Col. 4, line 32, after "type" insert -- network --.
Col. 5, line 68, change "an" to -- any --.
Col. 7, line 6, after "as" insert -- follows: --.
Col. 9, line 55, change "storing" to -- storage --.
Col. 9, line 59, change "known" to -- unknown --.
Col. 10, line 11, change "derived" to -- artificial --.
Col. 10, line 39, change "derived" to -- artificial --.
Col. 10, line 52, change "derived" to -- artificial --.
Col. 10, line 68, change ";" to -- : --.
Col. 11, line 7, change "derived" to -- artificial --.
Col. 11, line 31, change "derived" to -- artificial --.
Col. 11, line 33, change "derived" to -- artificial --.
Col. 12, line 10, change "derived" to -- artificial --.
Col. 12, line 24, change "derived" to -- artificial --.
Col. 12, line 46, change "derived" to -- artificial --.
```

Signed and Sealed this

Twenty-seventh Day of November, 1990

Attest:

HARRY F. MANBECK, JR.

*Attesting Officer*　　　　　　*Commissioner of Patents and Trademarks*